United States Patent [19]
Tamura et al.

[11] Patent Number: 5,309,382
[45] Date of Patent: May 3, 1994

[54] BINARY SHIFTER

[75] Inventors: Leilani Tamura, Redwood City; Thang Vo, Fremont, both of Calif.

[73] Assignee: Silicon Graphics, Inc., Mountain View, Calif.

[21] Appl. No.: 956,867

[22] Filed: Oct. 1, 1992

[51] Int. Cl.$^5$ .............................................. G06F 7/38
[52] U.S. Cl. ..................................... 364/715.08
[58] Field of Search ................. 364/715.08, 715.01

[56] References Cited
U.S. PATENT DOCUMENTS

| | | | |
|---|---|---|---|
| 4,122,534 | 10/1978 | Cesaratto | 364/715.08 |
| 4,472,788 | 9/1984 | Yamazaki | 364/715.08 |
| 4,901,263 | 2/1990 | Ho et al. | 364/715.08 |
| 5,130,941 | 7/1992 | Kudou | 364/715.08 |

Primary Examiner—Long T. Nguyen
Attorney, Agent, or Firm—Townsend and Townsend Khourie and Crew

[57] ABSTRACT

A binary shifter which utilizes shifter control logic to shift a 64-bit binary word by shift amounts up to 63 bit positions using a pre-multiplexer and shifter array configuration capable of shifting up to 32 bit positions. The shifter control logic executes two cycles of shifting operations to achieve shift amounts greater than 32 bits. An improved shifter pre-multiplexer and array for shifting 64-bit binary words by up to 32 bit positions in one cycle is disclosed. The improved shifter pre-multiplexer and array uses 9:1 pre-multiplexer cells with tristate outputs to place input data on selected discrete sections of horizontal data lines allowing for a reduced number of cells and control lines.

6 Claims, 11 Drawing Sheets

BINARY SHIFTER

FIELD OF THE INVENTION

The present invention relates generally to binary shifters in computer arithmetic logic units, and specifically to an improved 64-bit shifter for performing arithmetic and logical shifts in an arithmetic logic unit.

BACKGROUND OF THE INVENTION

Shift operations are common in computer arithmetic logic units (ALUs). Different types of shifts are possible as, for example, an arithmetic shift which is used to multiply or divide a binary value by a factor which is a power of two while preserving the arithmetic sign of the value. Other types of shifts are logical shifts which serve to move bit patterns of the binary value or word to the left or right within the word so that, for example, a series of bits can be repositioned from the lower half of the word to the upper half of the word.

As shown in FIG. 1A, a typical shifter will have an input 10 for loading a binary word into the shifter and an output 20 for outputting a shifted binary word to external hardware. The loading of the input binary word is performed in parallel so that, in the example of a 64 bit shifter, all 64 bits of the input binary word will be loaded into the shifter at once. Similarly, the output of the shifter usually matches in number the number of input lines (one line per bit) in the input binary word. Thus, a 64 bit shifter will also have 64 bits of parallel output.

A shifter also includes control signals 30 for performing the loading of the input binary word and performing the shifting of the binary word by a specified number of bits, either right or left. Also, new data such as a bit value to take the place of a bit value being shifted away from either the left or right edges of the computer word within the shifter can be specified. The shifter output will typically reflect the current state of the computer word being shifted.

In order for a microprocessor shifter to be fully functional, every shifter output bit needs access to every shifter input bit and the sign or zero bit. The sign bit is the leftmost bit in arithmetic shift instructions while the zero bit is the input value used for logical shift operations to fill a leftmost or rightmost bit position in a word being shifted.

The most straightforward method of shifting binary values is with a single large array arrangement of transistor "cells." For example, FIG. 1B depicts a typical array of NMOS pass gates 100 for a simple 4-bit shifter capable of shifting up to 3 bit positions. The wires and transistors are drawn as they would be drawn in the physical shifter layout. Data flows through the shifter from top to bottom. Inputs 102 correspond to the four bits in the input word and are designated IN(O), IN(1), IN(2) and IN(3). Inputs 102 enter the "top" of the shifter and are generated by external circuitry (not shown). Outputs 104 are designated OUT(0), OUT(1), OUT(2) and OUT(3). Outputs 104 flow out the bottom of the shifter. For simplicity, the required control lines are not shown in FIG. 1B.

In order for each output bit to have access to each input bit, each vertical input line 106, 108, 110 and 112, must extend horizontally across the entire width of the shifter as shown by horizontal data lines 114, 116, 118 and 120. For an N-bit shifter, N horizontal input data lines would be required. In order to shift by any shift amount ("SA") up to 3, a pass-gate from each horizontal data line to each vertical output line is required. Sixteen pass gates such as pass gate 122 are shown connecting horizontal data lines 114, 116, 118 and 120 with vertical output lines 105, 107, 109 and 111, respectively. Note that since the control lines are not shown, there is no connection to the gate of pass gate 122. And, in order for each output to have access to the sign-or-zero bit on line 124, we need a vertical sign-or-zero line per bit as shown by vertical sign-or-zero lines 126, 128, 130 and 132, and a pass gate, such as pass gate 134, from the vertical sign-or-zero ("SOZ") lines to their corresponding output line. In order to minimize the number of different control signals that need to be generated, there is a SOZ passgate (from the vertical SOZ line to the corresponding output line) for each data passgate (from the horizontal data line to the vertical output line). In this way, the multiple passgates which connect each vertical SOZ line to the corresponding output line perform an OR function, and the same control signals can be used for both the data passgates and the SOZ passgates.

The physical structure depicted in FIG. 1B is undesirable because of the large number of transistors ($N \times N \times 2$ for an N-wide shifter) and control lines required. Thus, most shifter structures implement some kind of pre-muxing.

The typical 64 bit shifter described here uses a multiplexer to shift the input data by the shift amount modulo 4 (hereinafter "(SA MOD 4)"). Then this pre-shifted data is input to the shifter array. The shifter array shifts the pre-shifted data by (SA DIV 4)×4 bits, where the "DIV" operation is the integer result (i.e., less the remainder) of dividing the first operand ("SA", in this case) by the second operand ("4", in this case). The total shift is then ((SA MOD 4)+(SA DIV 4)×4 bits. For example, for SA=50, the pre-mux would shift the input data by (50 MOD 4)=2. Then the shifter array would shift the pre-shifted data by (50 DIV 4)×4=12×4=48 bits, for a total shift of 50 bits. The advantage of pre-muxing is that it greatly simplifies the required array structure. In this array structure, the output line of each bit, bit need only access: 1) the pre-shifted data for every 4th bit slice, and 2) the sign-or-zero bit.

FIG. 2 shows pre-multiplexing (or "pmux") cell 140. Pmux 140 is a 7:1 mux which is drawn as it would be oriented in the physical shifter layout. Inputs of pmux 140 include the input bit for a particular bit slice, IN(n), and the input bits for the 3 bit slices to each side. Pmux output 142 is the vertical input data line of the shifter array.

FIG. 3 shows basic cell 150 of a shifter array used with pre-multiplexing cells such as pmux 140 of FIG. 2. Basic cell 150 is drawn in the orientation it would appear in a physical silicon chip embodiment. Basic cell 150 is 4 bits wide and tall. Four horizontal lines 152, 154, 156 and 158 are 4 input data lines ("D-lines"). Four vertical lines 160, 162, 164 and 166 are 4 output data lines ("On-lines"). Four vertical sign-or-zero ("SOZ") lines 168, 170, 172 and 174 are also shown. Select data ("SD") line 176 controls the selection of input data (from the D-lines) onto the corresponding O-lines. Select sign-or-zero ("SS") line 178 controls the selection of the SOZ data onto the corresponding O-lines. The 64-bit shifter array is a 16×16 array of the basic cell 150 of FIG. 3.

FIG. 4 shows a 4-bit slice 200 of the 64-bit shifter pre-multiplexer and shifter array. The 4 bit slice consists of 4 horizontal pmux cells 202, 204, 206 and 208 and 16 1. vertical basic cells 210. The 64-bit shifter consists of 16 of these 4-bit slices 200.

FIG. 5 shows a diagram of the entire 64-bit shifter array and how the D-lines start out vertical and then become horizontal. Sample instances of 4-bit nibbles of vertical D-lines are shown at 222 and 224. In actuality there are sixteen nibbles of vertical D-lines, one for each nibble column such as nibble column at 230. Sample instances of the basic cells are shown at 226 and 228. For clarity, the transistors in the basic cells are not shown.. In actuality there are 16×16 basic cells in the array. The 4 diagonal dots in basic cell 226 and basic cell 228 represent the "vias" where the vertical D-lines meet the horizontal D-lines. Even if the input data to the array is pre-multiplexed, each output bit of the array must still have access to every 4th input bit. Thus, 64 continuous horizontal input data lines are required. Note that because of the pre-multiplexing, this array structure requires only (256×4)×2=2048 transistors to implement; this is ¼ of the 64×64×2=8096 transistors which an array with no pre-muxing would require.

FIG. 6 shows a diagram of the required control lines for the entire shifter array. 31 control signals are necessary to implement the full functionality of the 64-bit typical shifter. Each diagonal line actually represents a pair of lines. The first signal in the pair connects to the SD line of a basic cell; the second signal in the pair connects to the SS line of a basic cell.

The control signals depicted in FIG. 7 are defined as shown in Table 1.

TABLE 1

| | |
|---|---|
| L15 = | "1" if Shift Left and (SA DIV 4) = 15 |
| L14 = | "1" if Shift Left and (SA DIV 4) = 14 |
| L13 = | "1" if Shift Left and (SA DIV 4) = 13 |
| L12 = | "1" if Shift Left and (SA DIV 4) = 12 |
| L11 = | "1" if Shift Left and (SA DIV 4) = 11 |
| L10 = | "1" if Shift Left and (SA DIV 4) = 10 |
| L9 = | "1" if Shift Left and (SA DIV 4) = 9 |
| L8 = | "1" if Shift Left and (SA DIV 4) = 8 |
| L7 = | "1" if Shift Left and (SA DIV 4) = 7 |
| L6 = | "1" if Shift Left and (SA DIV 4) = 6 |
| L5 = | "1" if Shift Left and (SA DIV 4) = 5 |
| L4 = | "1" if Shift Left and (SA DIV 4) = 4 |
| L3 = | "1" if Shift Left and (SA DIV 4) = 3 |
| L2 = | "1" if Shift Left and (SA DIV 4) = 2 |
| L1 = | "1" if Shift Left and (SA DIV 4) = 1 |
| L0 = | "1" if Shift Left and (SA DIV 4) = 0 or Shift Right and (SA DIV 4) = 0 |
| R15 = | "1" if Shift Right and (SA DIV 4) = 15 |
| R14 = | "1" if Shift Right and (SA DIV 4) = 14 |
| R13 = | "1" if Shift Right and (SA DIV 4) = 13 |
| R12 = | "1" if Shift Right and (SA DIV 4) = 12 |
| R11 = | "1" if Shift Right and (SA DIV 4) = 11 |
| R10 = | "1" if Shift Right and (SA DIV 4) = 10 |
| R9 = | "1" if Shift Right and (SA DIV 4) = 9 |
| R8 = | "1" if Shift Right and (SA DIV 4) = 8 |
| R7 = | "1" if Shift Right and (SA DIV 4) = 7 |
| R6 = | "1" if Shift Right and (SA DIV 4) = 6 |
| R5 = | "1" if Shift Right and (SA DIV 4) = 5 |
| R4 = | "1" if Shift Right and (SA DIV 4) = 4 |
| R3 = | "1" if Shift Right and (SA DIV 4) = 3 |
| R2 = | "1" if Shift Right and (SA DIV 4) = 2 |
| R1 = | "1" if Shift Right and (SA DIV 4) = 1 |

SUMMARY OF THE INVENTION

In the preferred embodiment, the present invention allows the shifting of a 64-bit binary word by 0 to 63 bits by using a shifter which is only capable of shifting up to 32 bits in one cycle or pass. This is achieved by control circuitry which controls the input to the shifter array during each cycle. For instances of shifting greater than or equal to 32 bits, the control circuitry provides for shifting the word by 32 bits in the first cycle and by the remaining bits, if any, during the second cycle. If the shift amount is less than 32 bits, then the shift can be performed in one cycle.

The invention also provides for a greatly reduced gate count and a smaller number of control lines from traditional shifter arrays.

DESCRIPTION OF THE PREFERRED EMBODIMENT

Figure 1A:
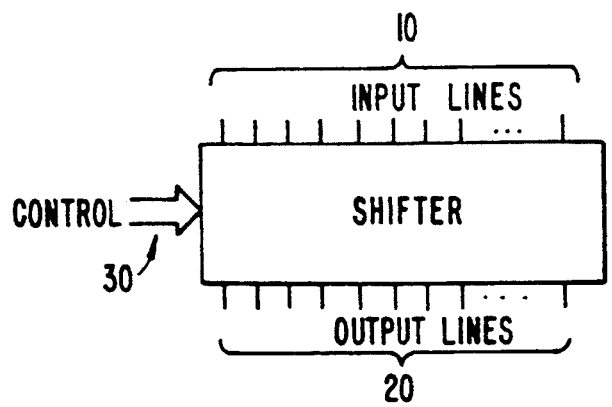
FIG. 1A is an illustration of a prior art binary shifter.
Figure 1B:
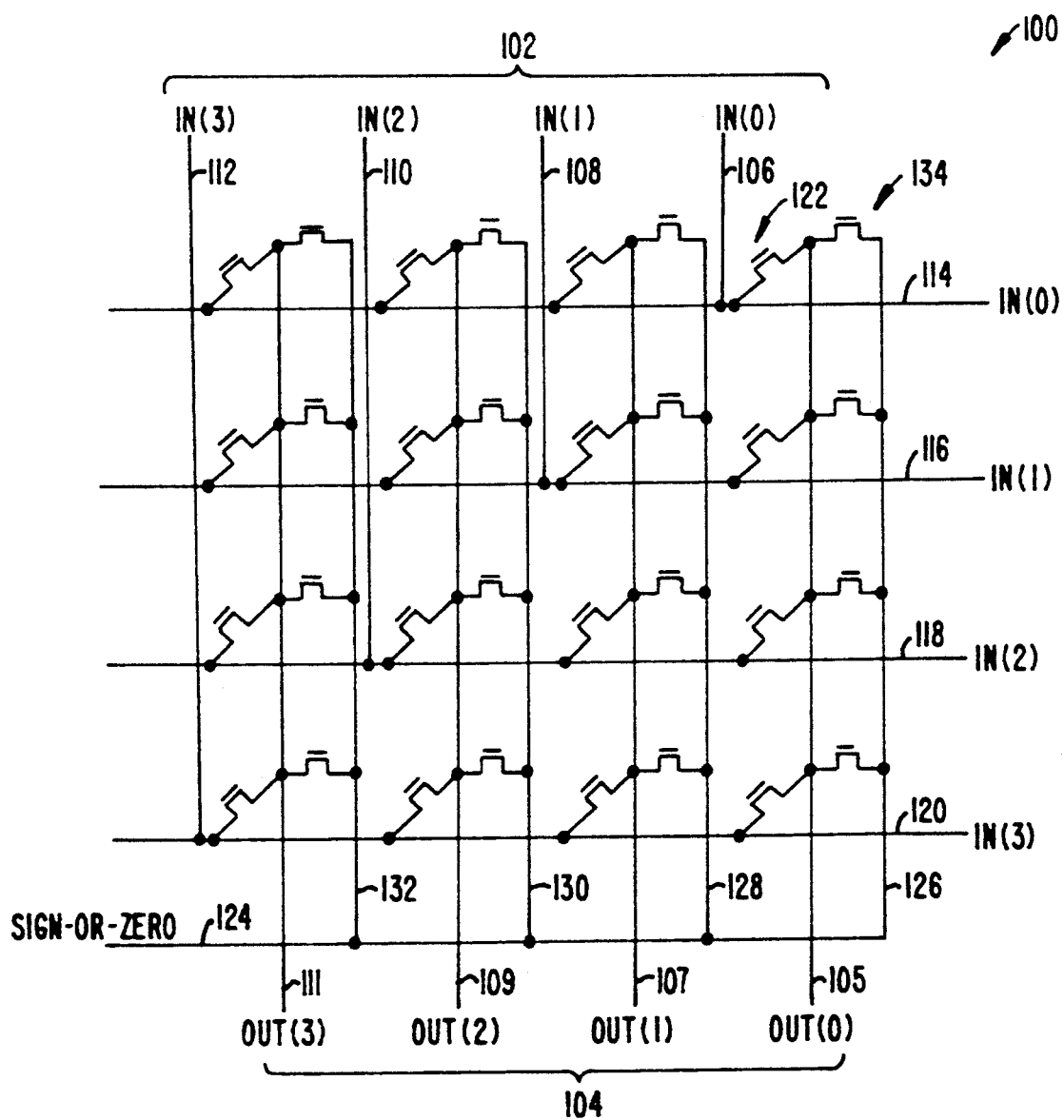
FIG. 1B is a gate-level illustration of a 4-bit binary shifter of the prior art.
Figure 2:
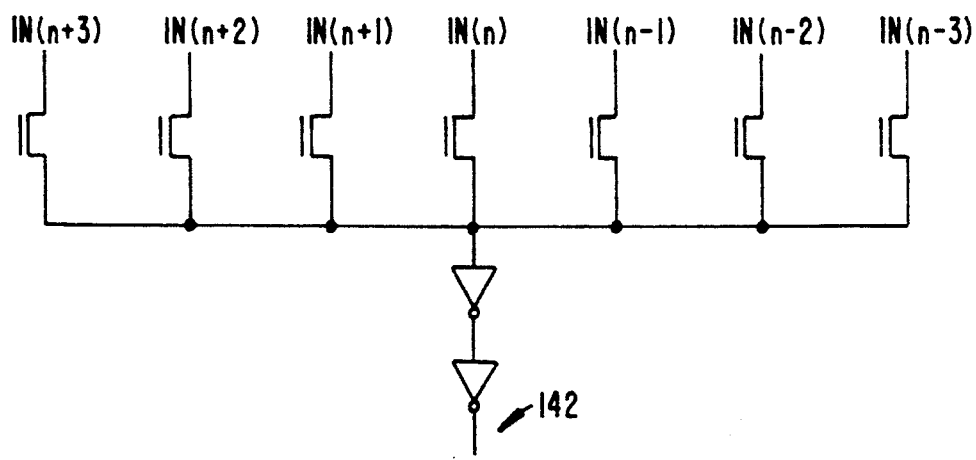
FIG. 2 shows a prior art pre-multiplexing cell.
Figure 4:
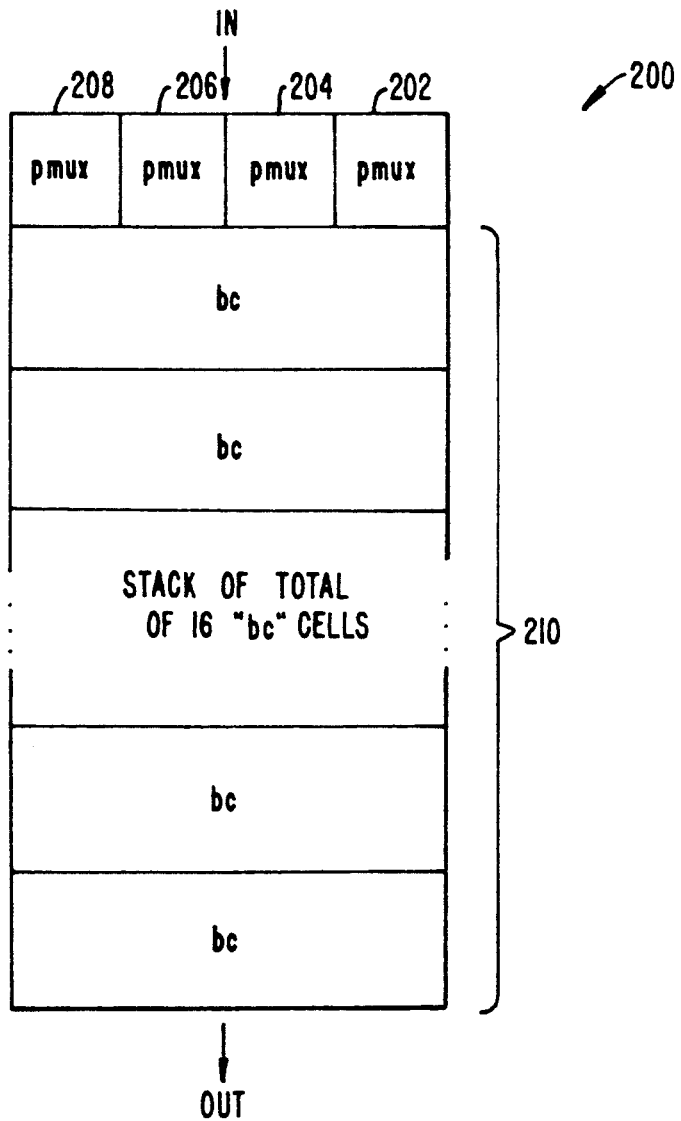
FIG. 4 shows a 4-bit slice of a prior art 64-bit shifter including pre-multiplexer cells and the shifter array.
Figure 3:
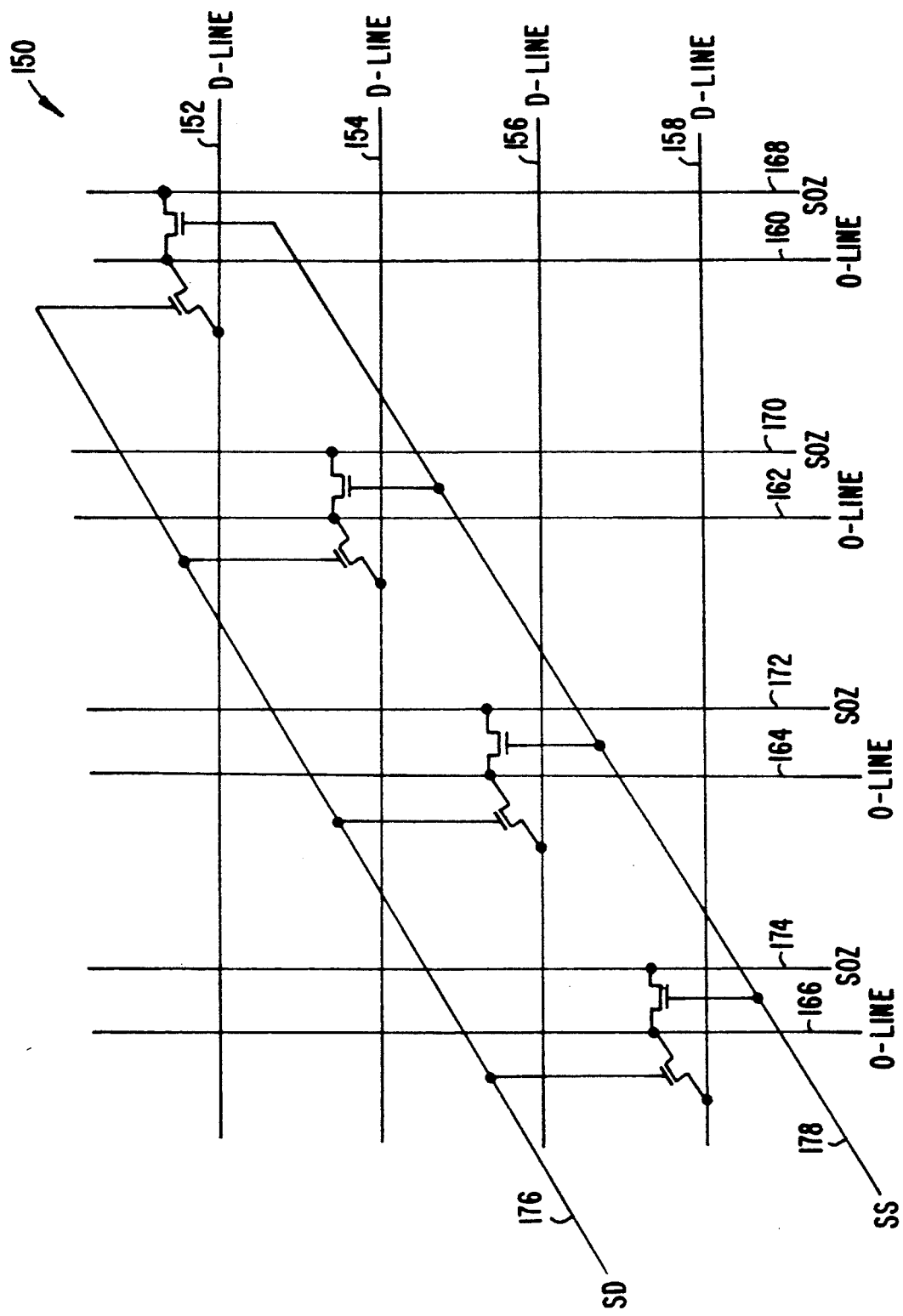
FIG. 3 shows a basic cell of a prior art 64-bit shifter array.
Figure 5:
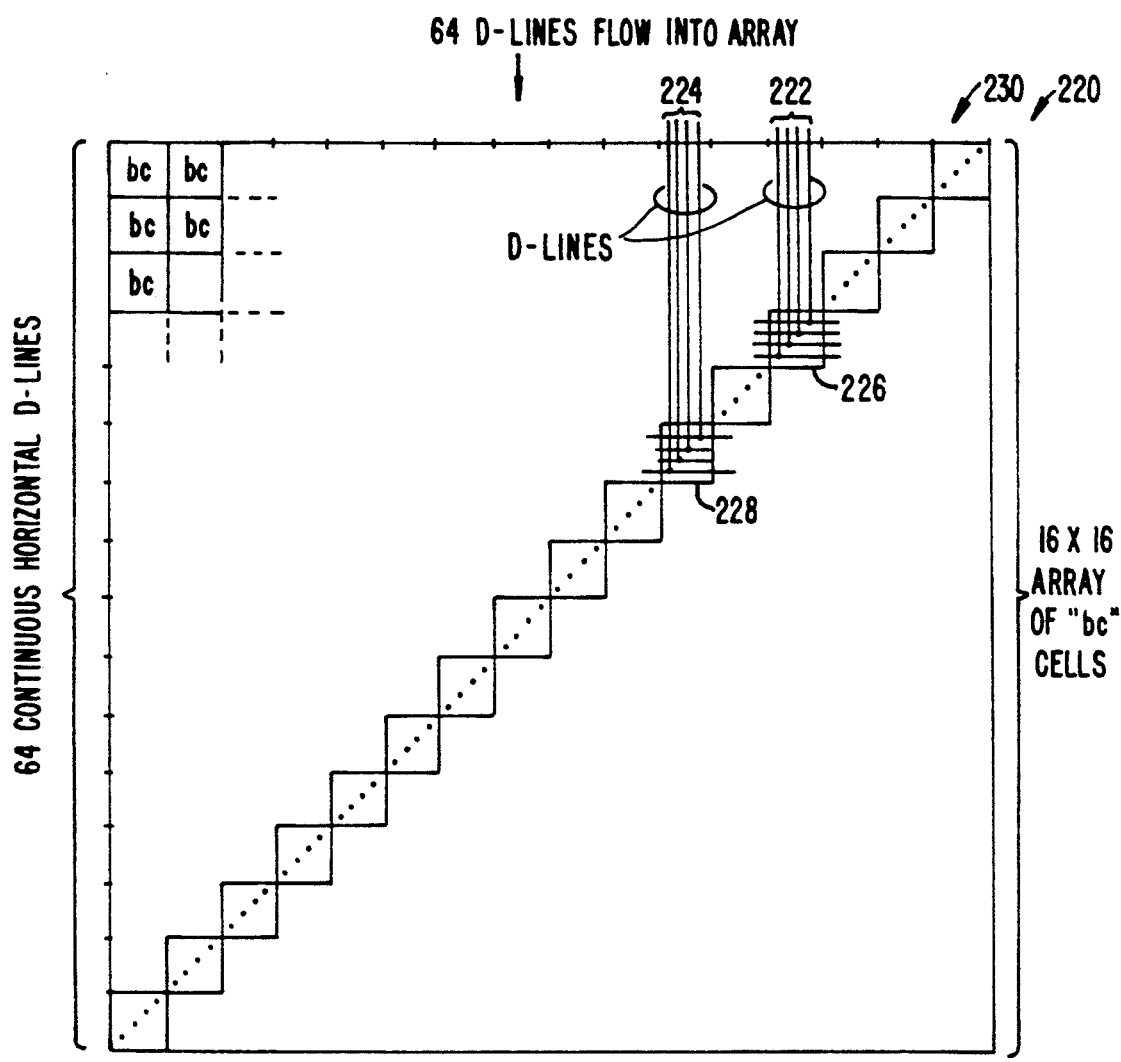
FIG. 5 illustrates portions of the D-lines of a prior art 64-bit shifter.
Figure 6:
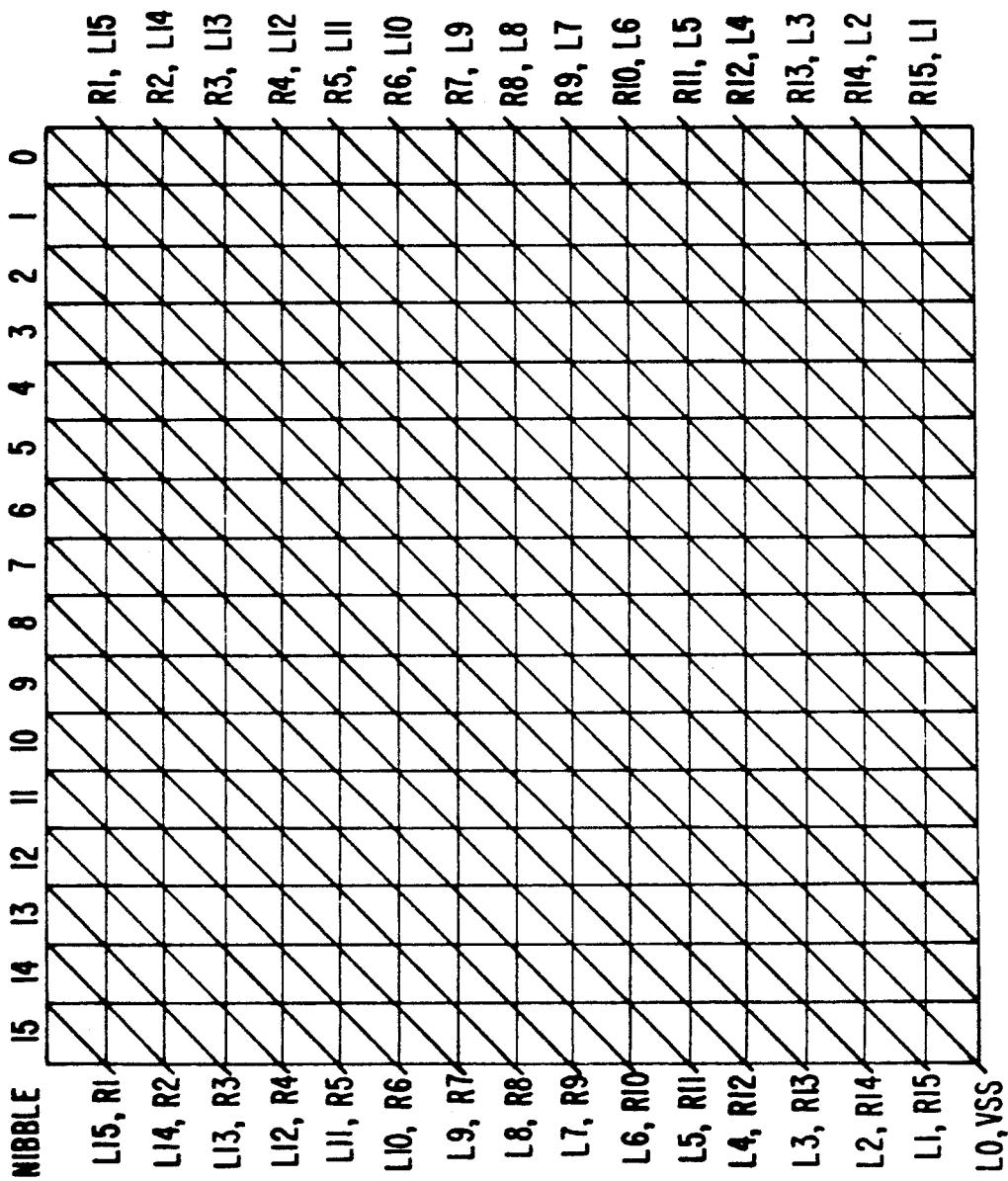
FIG. 6 illustrates the control lines of a prior art 64-bit shifter array.
Figure 7:
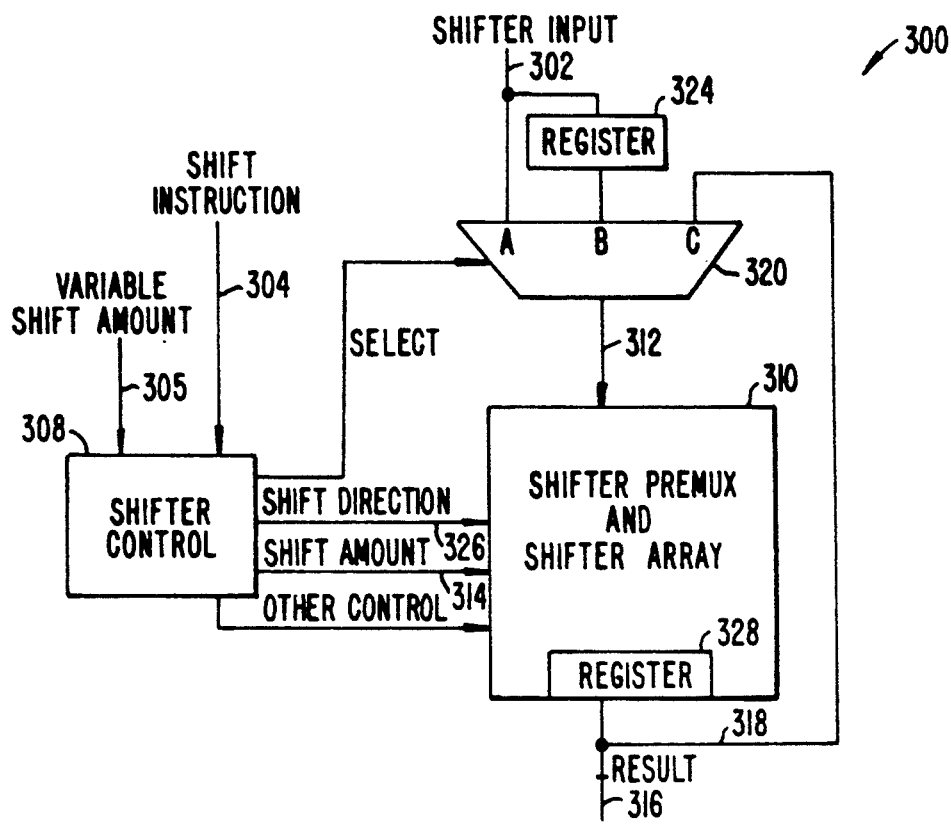
FIG. 7 is a block diagram of the shifter control and datapath of the present invention.

FIG. 7 shows a block diagram of the binary shifter datapath and control circuitry. The diagram shows how control interacts with the datapath portions to select appropriate shifter input and shift amount values for each shifter cycle. In FIG. 7, binary shifter 300 has, as inputs, input lines 302 for inputing the binary word to be shifted, shift instruction lines 304 for determining the shift amount and shift direction, and variable shift amount lines for receiving the shift amount from a register in memory.

Shift instruction lines 304 are derived from the instruction bus of the arithmetic logic unit ("ALU") with which the binary shifter operates (the instruction bus and ALU are not shown). Shifter control 308 decodes the instruction to determine the characteristics of the shift (i.e., left or right shift, immediate or variable, logical or arithmetic) and sends the appropriate control signals to the shifter. In the preferred embodiment, the binary word width is 64 bits. Thus, input line 302 would be 64 in number for parallel input of the binary word to the shifter 300.

While the preferred embodiment uses a 64 bit input word, it will readily be seen that the present invention can be adapted to shift words of various widths. Shift instruction lines 304 include bits which specify a binary value of from 0-63 as the number of bits to be shifted. The direction of shift on line 326 can be indicated, for example, by a logic low for a left shift and logic high for a right shift. For ease of illustration, multiple signal lines or a set of signals used to convey a binary value or a logical grouping are shown in FIG. 7 as single lines.

Shift instruction lines 304 are used by shifter control 308 to select the input for, and to control, shifter array 310. In the preferred embodiment, shifter 300 of the present invention operates in conjunction with an ALU which provides specialized shifter commands. Some of these specialized shifter commands provide for shifting a 64 bit binary word by less than 32 bits. In these cases, since shifter array 310 is capable of shifting a 64 bit word by 32 bits very rapidly, the shift operation can be performed in a single cycle of the ALU. Other shift instructions require shifts of greater than 31 bits and two machine cycles must be used.

In the case where the shift amount is less than 32 bits, shifter control 308 selects the input data on line A as the input for shifter premux and array ("premux/array") 310 by applying the signal on 302 to the lines 312. Simultaneous with the selection of the input word onto line 312 the shift amount is specified on line 314 to the shifter premux/array 310. The shifter array is able to achieve the shift of less than 32 bits on the 64 bit word within one cycle and outputs the result on the output lines 316 at the end of one cycle.

In the case where the shift amount is greater than 31 bits, two cycles must be used in order to accomplish the entire shift. In the first cycle, as before, the input signals at 302 are applied to the input lines of the shifter premux/array 310 at lines 312. However, since the control logic has detected that this is a shift of greater than 31 bits, the signals put out by the shifter control 308 on lines 314 specify a first shift amount of 32 bits. At the end of the first cycle, the result of the 32 bit shift is applied to lines 318 and routed to the selection multiplexer 320 at input C. At the beginning of the second cycle, shifter control 308 selects input C of the multiplexer to be applied to the input of the shifter premux/array 310 on lines 312. Shifter control 308 also calculates the amount of bits remaining to be shifted in order to achieve the shift amount initially indicated by the shift instruction. The shifter array shifts the data the remaining amount and outputs the result on lines 316.

Still another set of shifter commands allows a register in memory to be used to specify the amount of bit positions to be shifted. In the case of a variable shift instruction, the ALU must retrieve the variable shift amount value from a register location. This register retrieval from memory occupies one machine cycle. However, while the shifter is waiting for retrieval of the shift amount value, shifter control 308 directs multiplexer 320 to apply the input data at lines 302 to output lines 312. This simultaneously-applies the data to register 324 and shifter premux/array 310. Register 324 is used to latches the data at this time so that the initial data is retained for further use.

As before, shifter premux/array 310 is used to shift the data by 32 bits in the direction indicated by shift direction line 326. Thus, by the end of the first cycle, the ALU has fetched the variable shift amount from a memory register location (not shown), register 324 contains the initial binary word to be shifted, and input C of multiplexer 320, as held by register 328 of shifter premux/array 310, holds the initial data shifted by 32 bits. At the beginning of the second machine cycle, the control logic is presented with the shift amount on line 305.

If the control circuit 308 determines that the shift amount is greater than 32 bits, the shifter control 308 selects input C of multiplexer 320 to be the input to shifter premux/array 310. This provides shifter premux/array 310 with data which has already been shifted by 32 bits. Thus, shifter control 308 specifies the difference between the shift amount less the 32 already shifted as the new shift amount on line 314 to be performed during the second cycle by shifter premux/array 310. Alternatively, if the shifter control 308 determines that the shift amount, as indicated by lines 304, is less than 32 bits, the shifter control 308 selects the value in register 324 at input B of multiplexer 320 as the new data to be applied to shifter premux/array 310. The shift amount specified on lines 314 by shifter control 308 will then be the same as the shift amount specified by the shift instruction. The shifter premux/array 310 accomplishes this shift during the second cycle and outputs the result on lines 316.

By providing a shifter control which allows shifting of half the word to be done in parallel with the retrieval of a variable value from memory in the case where the shifter instruction specifies a variable shift amount, a time savings is achieved. Further, since shifter premux/array 310 only needs to shift a maximum of 32 bits, a gate and control signal savings within shifter premux/array 310 is achieved as is discussed below.

Figure 8:
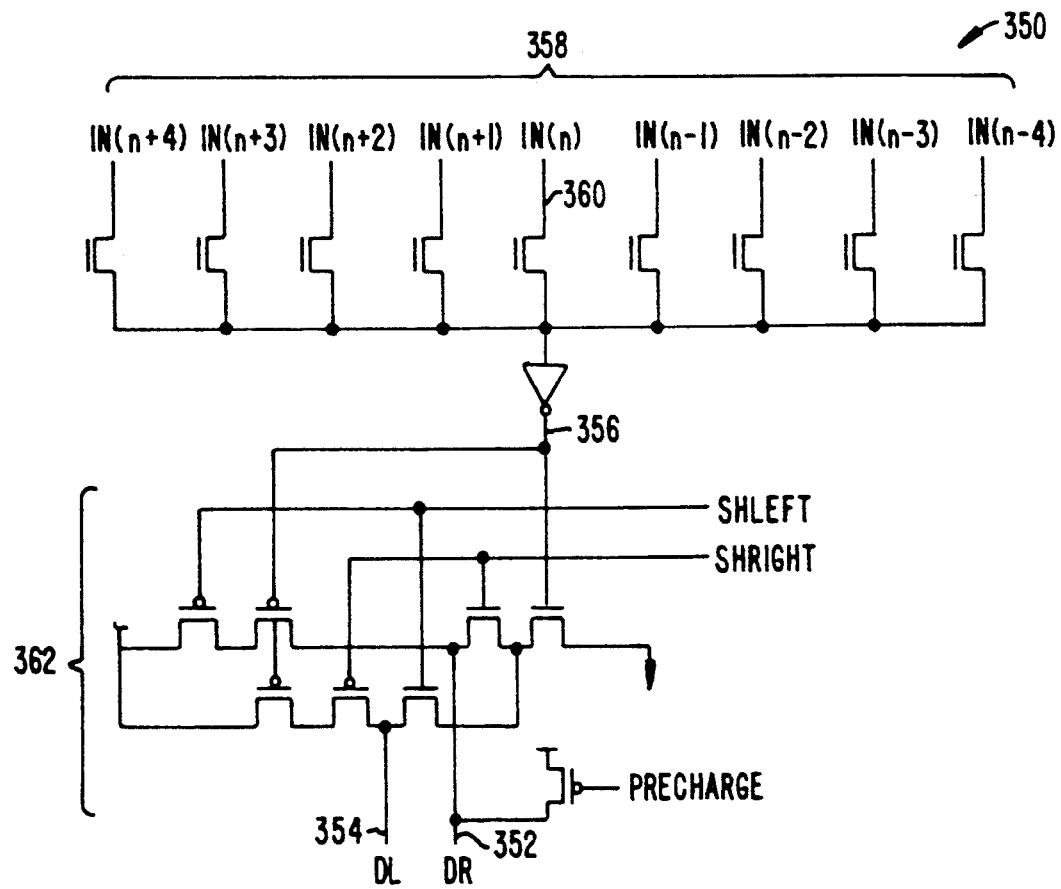
FIG. 8 is a diagram of a pre-multiplexing cell of the present invention.

FIG. 8 shows pre-multiplex ("pre-mux") cell 350 of the present invention. Pre-mux cell 350 implements left and right shifts of up to 4 bits by using a 9:1 multiplexer ("mux"). For shifts with $N < 32$, pre-mux cell 350 implements a shift of (N MOD 4); for shifts of $N = 32$, pre-mux cell 350 shifts left or right by 4 bits.

In FIG. 8, nine mux inputs 358 are shown centered around one bit position at line 360. Mux output 356 is the input to tristate driver 362 which drives the input data lines of the shifter array discussed below. For right shifts, the mux output is driven onto DR-line 352, and the DL-line is not driven. For Left shifts, the mux output is driven onto DL-line 354, and the DR-line is not driven.

Since pre-mux cell 350 implements shifts of up to 4 bits, the maximum shift that must take place in the shifter array is 28 bits. Because the maximum required shift is only 28 bits (1) each output bit need only have access to every 4th bit of the 28 bits to the left and right of the particular output bit, and (2) only the 28 bits at the left and right edges of the array need access to the sign-or-zero bit. Thus, it is possible to "split" the horizontal D-lines every 28 bits. The use of "broken" horizontal D-lines which are continuous through, at most, 28 bit sections allows full shifter functionality with a much smaller shifter array.

Figure 9:
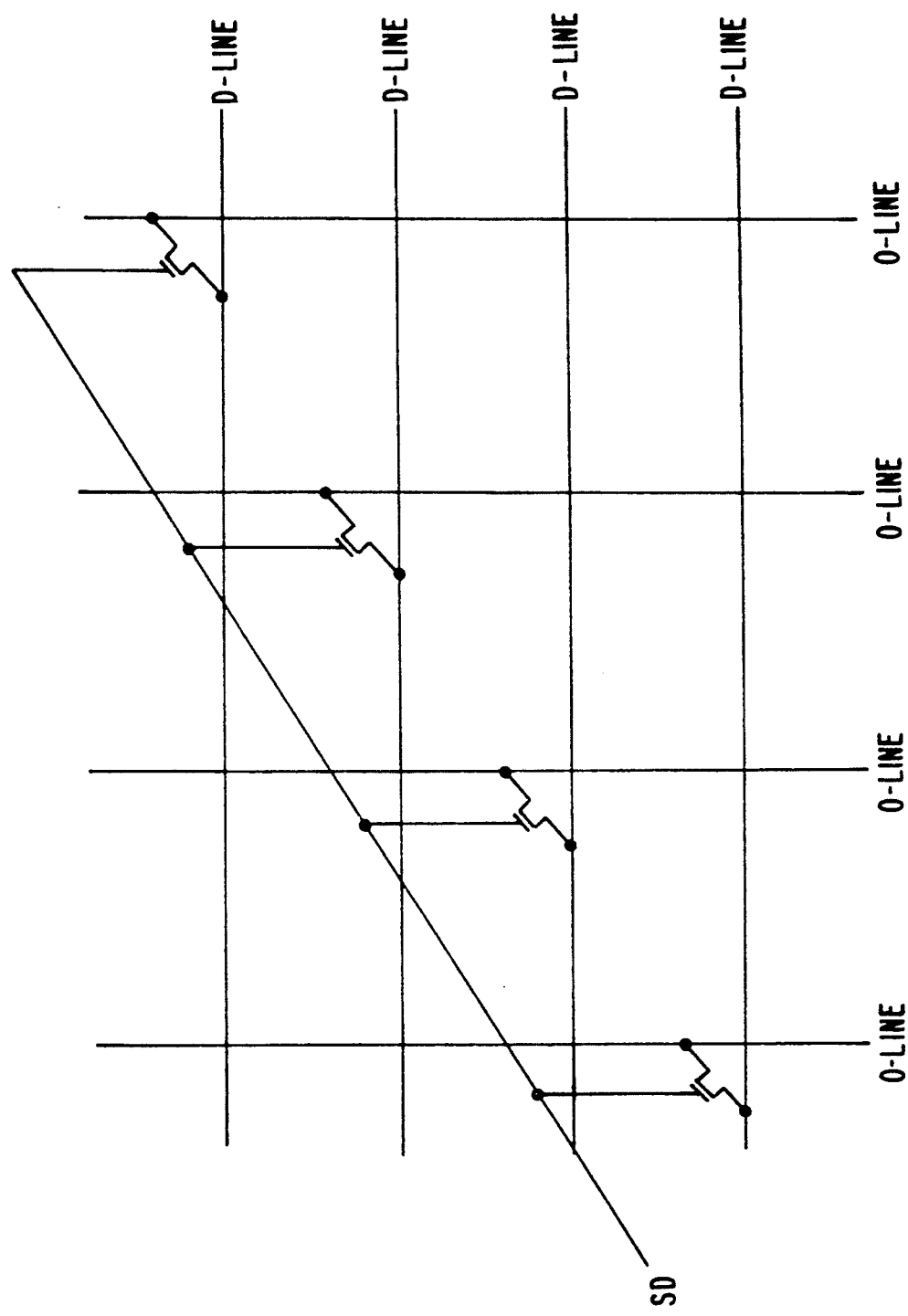
FIG. 9 shows a first basic cell of the shifter array ("bc1").
Figure 10:
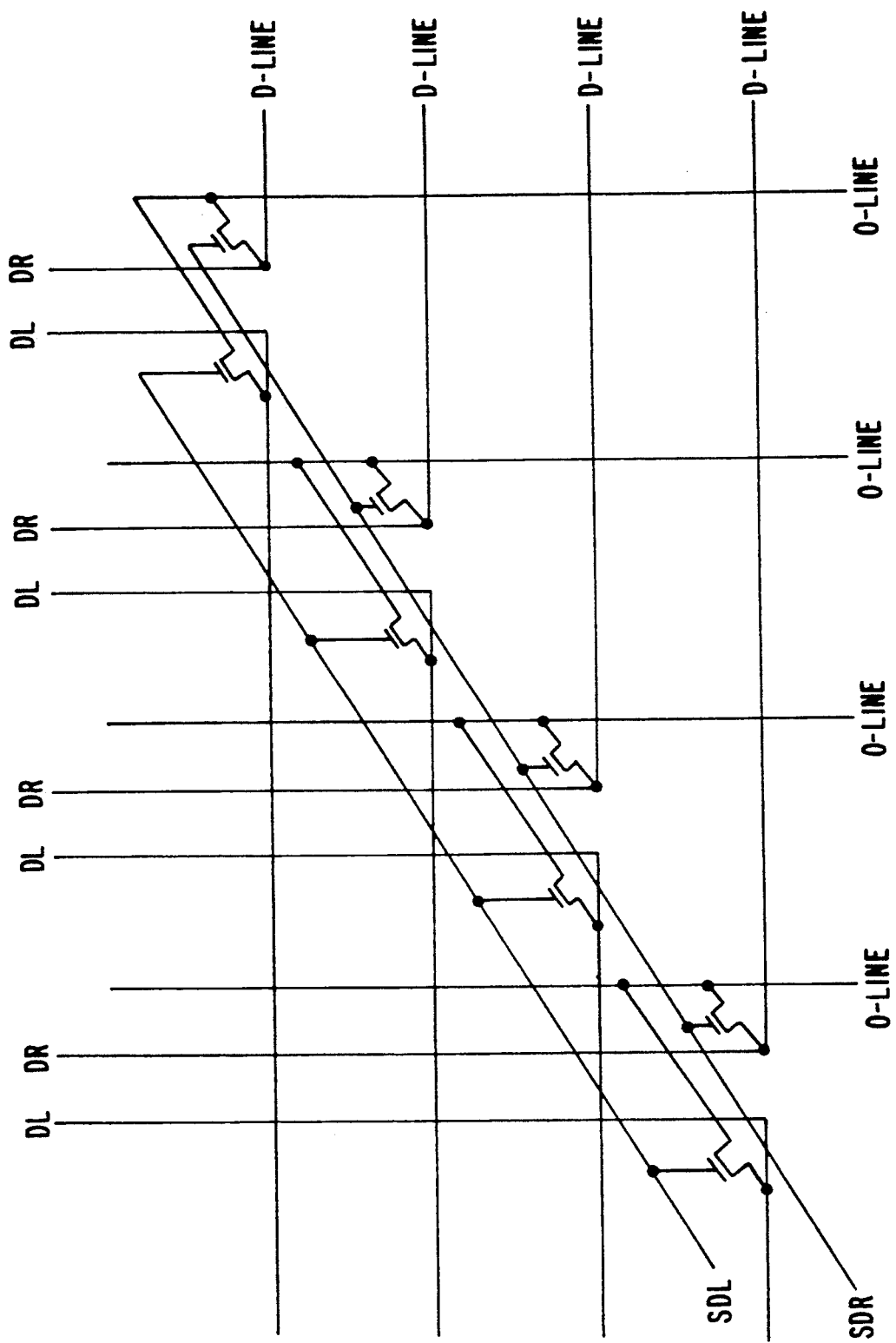
FIG. 10 shows a second basic cell of the shifter array ("bc2").

The shifter array is a 16×7 array of 2 different basic cells. FIGS. 9 and 10 show the physical structure of the 2 types of basic cells, "bc1" and "bc2", respectively. Cell bc1 is shown in FIG. 9 having 4 transistors which serve to switch the 4 horizontal D-lines to the four outputs upon the application of a high voltage to signal line SD. Cell bc1 represents four bits, or a "nibble" of data within the shifter array.

FIG. 10, shows cell bc2 having 8 transistors controlled by two signal lines SDL and SDR for applying the DL and DR signals from pre-mux cells (of FIG. 7) to the vertical O-lines. Note that each D-line shown in FIG. 10 contains a break so that the DR line is applied to the D-line from the break to the right while the DL line is applied to the D-line from the break to the left.

Thus, as will be shown below, a bc2 cell allows the output from a pre-mux cell to be selectively applied to its own O-lines, or to the O-lines of other cells to the right or left of the bc2 cell.

Figure 11:
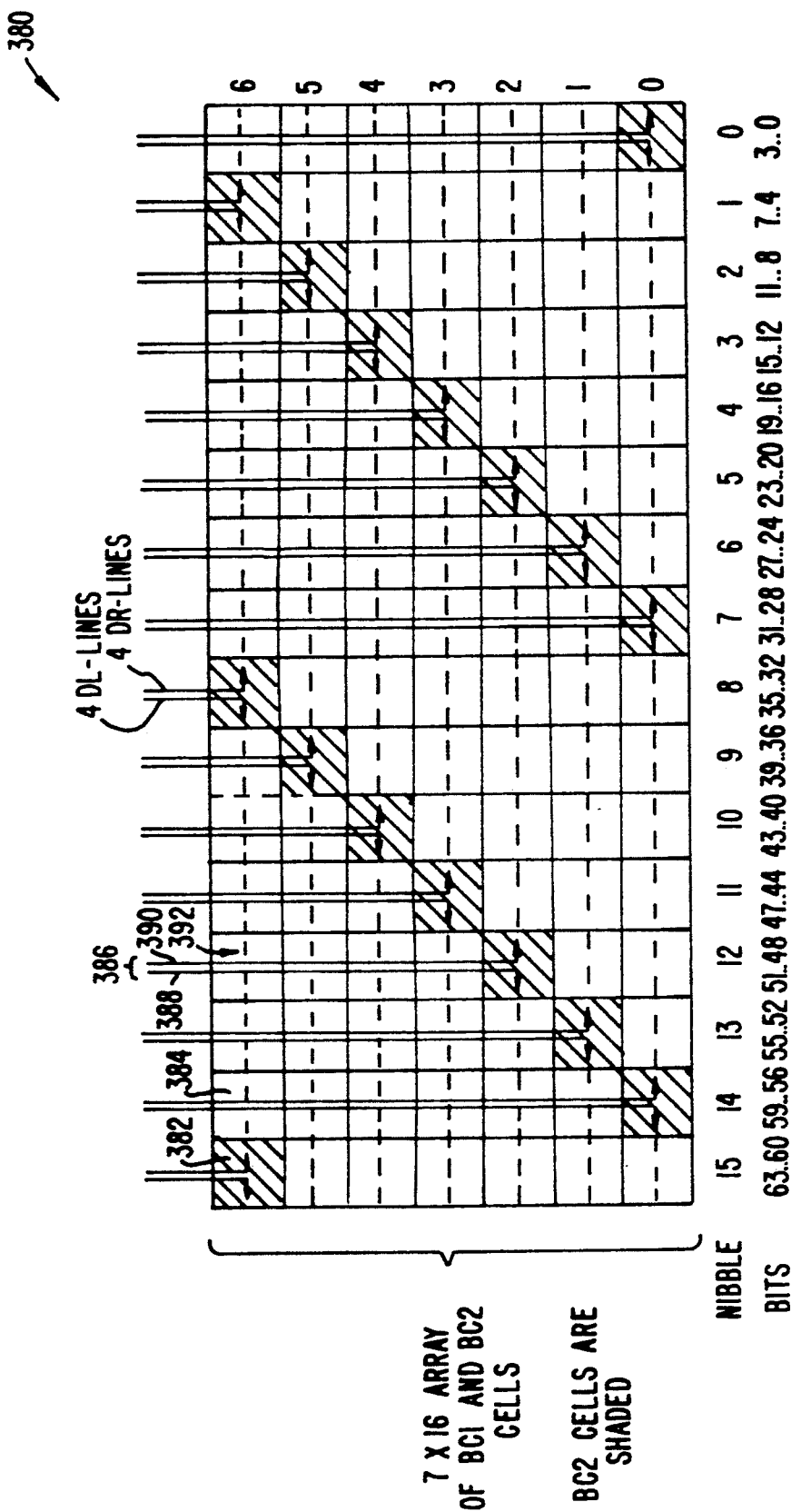
FIG. 11 shows DL and DR lines in the shifter array, and where the bc1 and bc2 cells are placed in the array.

FIG. 11 shows a diagram of the entire shifter array 380, where the bc1 and bc2 cells are placed, and how the DL and DR lines from the pre-mux cells are broken in the bc2 cells. In FIG. 11, bc2 cells such as 382 are shaded while bc1 cells such as 384 are unshaded. Thus, FIG. 11 shows 96 bc1 cells and 16 bc2 cells in the shifter array. Pairs of bold vertical lines such as 386 enter the array from the top and then diverge left and right from each bc2 cell. The left bold vertical line, such as 388, in each pair represents 4 DL lines while the right vertical line, such as 390, in each pair represents 4 DR lines. The arrows diverging horizontally at the end of each of the pairs of bold vertical lines indicate, graphically, that the signal on the DR lines is sent to cells to the right of the bc2 cell containing the arrows, while the signal on the DL lines is sent to cells to the left of the bc2 cell.

Shifter array 380 of FIG. 11 can be discussed in terms of nibble columns which are numbered along the bottom of the shifter array with the rightmost nibble column numbered 0 and the leftmost column numbered 15. Nibble column 0 is the least significant nibble in the 64-bit binary word output of shifter array 380.

Horizontal dashed lines such as 392 indicate that the DL and DR lines travel into neighboring cells in each row. A dashed line connecting 2 arrow-heads means that the DR lines driven by the more significant nibble are connected to the DL lines of the less significant nibble. For example, in the first row of the array, the DR lines of nibble 8 are connected to the DL lines of nibble 1, and the DR lines of nibble 15 are connected to the DL lines of nibble 8. In the second row of the array, the DR lines of nibble 9 are connected to the DL lines of nibble 2. Likewise for the other rows.

Since only the 28 left-most bits and the 28 right-most bits of the array require access to the sign-or-zero bit, we can drive in the sign-or-zero information into the array using the DL-lines at the left edge of the array and the DR-lines at the right edge of the array. This is possible because for right shifts (when we want to shift in zero or sign at the left edge of the array), the DL-lines at the left edge of the array are not driven by the pre-mux tristate drivers; and for left shifts (when we want to shift in zero at the right edge of the array), the DR-lines at the right edge of the array are not driven by the pre-mux tristate drivers. Thus, the shifter array does not need a vertical SOZ-line per bit, as was needed in the typical shifter array.

Figure 12:
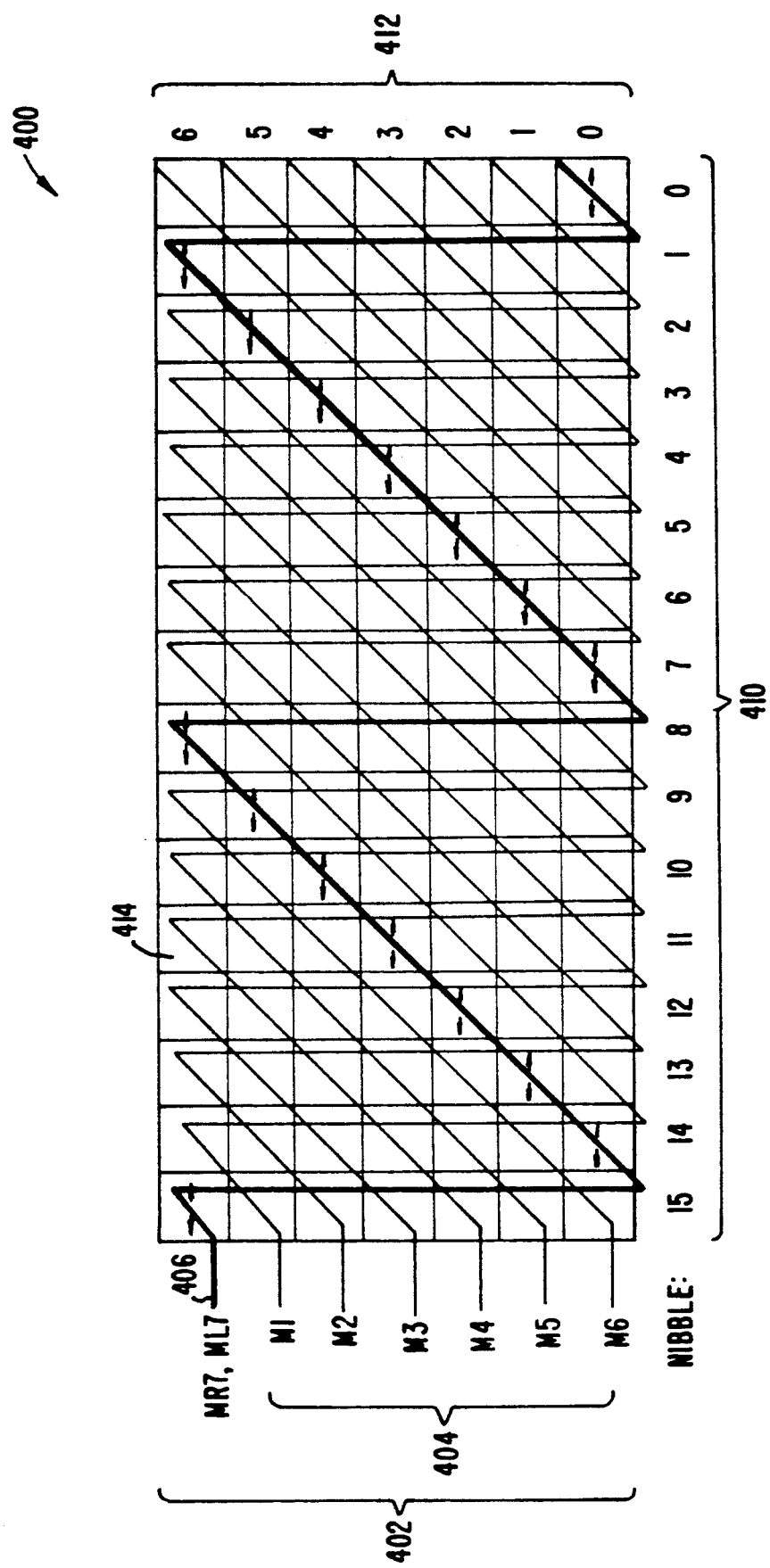
FIG. 12 shows control lines for the shifter array.

FIG. 12 shows a diagram of the required control lines for the entire shifter array of FIG. 11. In FIG. 12, the bc2 cells are indicated with double arrowheads. Only 8 control signals are required to implement the full functionality of the shifter array. Control signals 402 are routed in a zig-zag pattern. The lighter 6 zig-zags 404 are the control lines that connect to the SD line of bc1 cells. Bold zig-zag 406 represents a pair of signals, MR7 and ML7. MR7 connects to the SDL line of each bc2 cell, and ML7 connects to the SDR line of each bc2 cell.

The horizontal and vertical data lines have not been shown in FIG. 12. However, each nibble column in FIG. 12 includes 4 pairs of vertical DR/DL lines which become horizontal in the single bc2 cell in the column. Each row includes 3 sections of "broken" horizontal data lines connected to vertical data lines in the bc2 cells. The remaining bc1 cells each selectively couple the 4 horizontal data lines in their row to the 4 vertical output lines in their column. Thus, for each continuous section of horizontal data lines in a give row, the data on those lines is determined by either (1) a bc2 cell in the row being energized, or turned "on", by the application of a "1" on the SDR or SDL control line in the bc2 cell; or (2) by driving SOZ data from the left or right edges of the array.

The control signals depicted in FIG. 12 are defined as shown in Table 2.

TABLE 2

| | |
|---|---|
| M1 = | "1" if Left Shift and (N DIV 4) = 6 or if Right Shift and (N DIV 4) = 1 |
| M2 = | "1" if Left Shift and (N DIV 4) = 5 or if Right Shift and (N DIV 4) = 2 |
| M3 = | "1" if Left Shift and (N DIV 4) = 4 or if Right Shift and (N DIV 4) = 3 |
| M4 = | "1" if Left Shift and (N DIV 4) = 3 or if Right Shift and (N DIV 4) = 4 |
| M5 = | "1" if Left Shift and (N DIV 4) = 2 or if Right Shift and (N DIV 4) = 5 |
| M6 = | "1" if Left Shift and (N DIV 4) = 1 or if Right Shift and (N DIV 4) = 6 |
| MR7 = | "1" if Right Shift and (N DIV 4) = 7 or if Right Shift and (N DIV 4) = 8 or if Left Shift and (N DIV 4) = 0 |
| ML7 = | "1" if Left Shift and (N DIV 4) = 7 or if Left Shift and (N DIV 4) = 8 or if Right Shift and (N DIV 4) = 0 |

To illustrate the operation of the shifter array of FIG. 12, assume that a left shift of six bits (i.e., N=6) is desired. This results in control signal M6 being "high" or "1" (since (6 DIV 4)=1) while the remaining control signals are low. In this example, two bits of shift are accomplished by the premux cells at each input bit. Referring to FIG. 8, signal N(n-2) is selected as the input to tri-state driver 362 in each premux cell. The remaining 4 bits of left shift are achieved by the shifter array as described below.

Hereinafter cells will be designated by their position in the shifter array by row and column using the nibble column numbers 410 and row numbers 412. Thus, cell 414 of FIG. 12 is designated as cell (6,11).

With M6 high, the transistors in cells (0,15), (1,14) (2,13), (3,12), (4,11), (5,10), (6,9), (0,8), (1,7), (2,6), (3,5), (4,4), (5,3), (6,2), (0,1) and (1,0) will be on.

Since a left shift is being performed, the tristate drivers of each of the pre-mux cells of FIG. 8 will output the data on the DL line while the DR line is in a high-impedance state. This is because the SHLEFT signal will be high while the SHRIGHT signal is low. Thus, data will be applied from the DL lines of each bc2 cell in FIG. 12 to the cells leftwise adjacent to each bc2 cell (until a break in the horizontal D-line is encountered). This data will be routed downwards on output lines at the bc1 cell which has been turned on.

Figure 13:
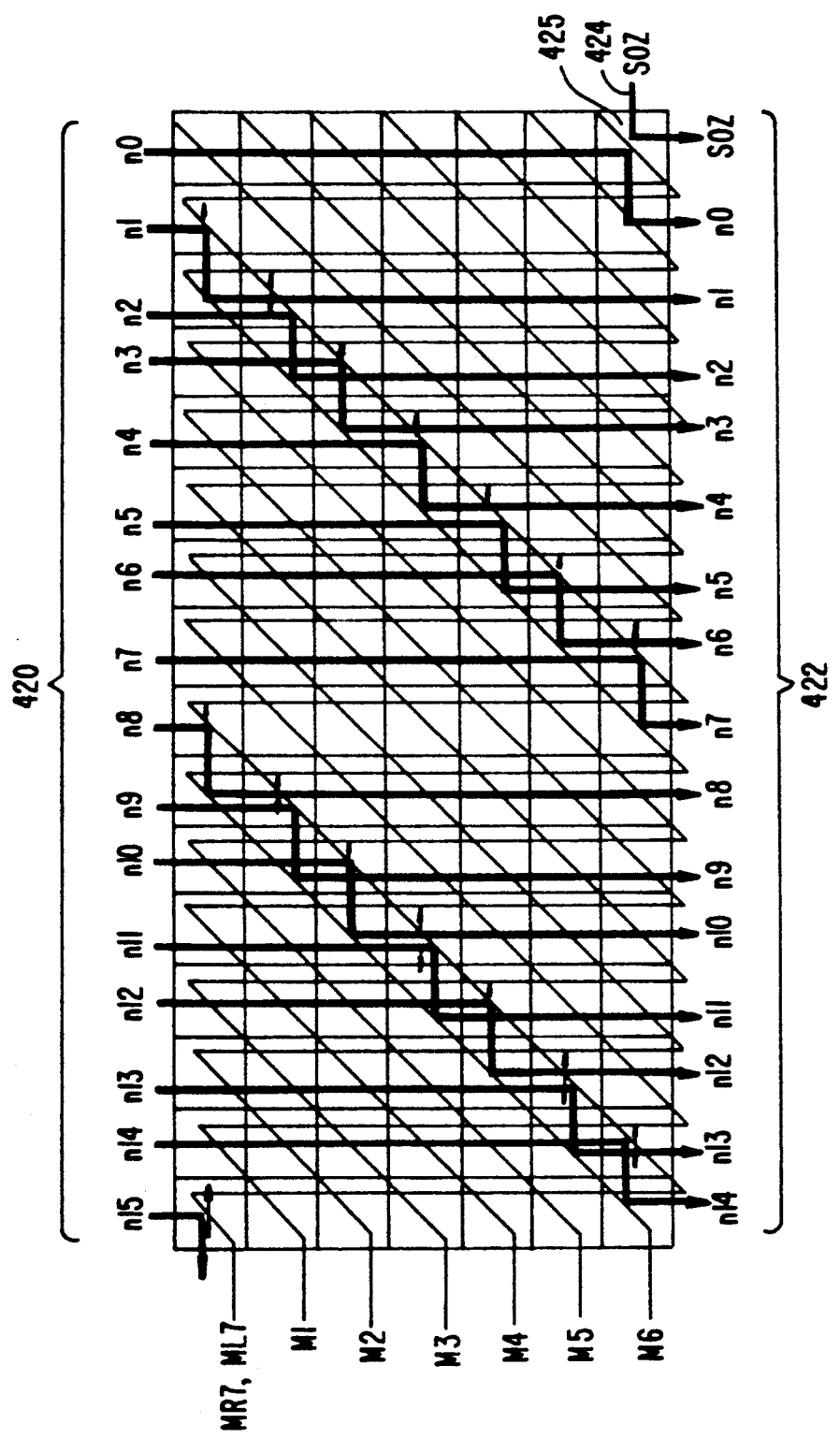
FIG. 13 shows the data flow from the input to the output in the shifter array for an example shift operation of 4 bits left.

FIG. 13 shows the data routing in the shifter array using the present example of a left shift of 4 bits. As can be seen from FIG. 13, the data at the inputs 420 is shifted left by one nibble, or 4 bits, at the output lines 422. Sign or zero signal 424 provides the data for nibble 0 which, in this case, would be a zero value. Sign or zero signal is applied to the DR signal lines for the cell (0,0) at 425 of FIG. 13 since the DR lines are in a high-impedance state for shift left operations. Data from n15 is not used by the shifter during a shift left by 4 bits and is not provided at the outputs.

Similarly, shifts of other magnitudes can be accomplished as defined by the control signals in Table 2 and the discussion herein.

The present invention is thus seen to reduce the number of cells required in a 64-bit shifter array from 16×16=256 to 16×7=112. The number of transistors is reduced from 16×16×8=2048 to 96×4+16×8=512. Also, the number of control lines, and, hence, the number of required metal traces on a silicon chip embodiment, is reduced.

In summary, by limiting 1-cycle shifts to N←32 bits and using the layout and control logic as described herein, the binary shifter of the present invention is capable of shifting by up to 63 bits in less than 50% of the layout area required for a typical 64-bit shifter. The binary shifter of the present invention requires only 512 transistors and 8 control signals, whereas the typical 64-bit shifter array requires 2048 transistors and 31 control signals.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various transistor technologies (e.g., metal-oxide-semiconductor, bipolar) may be used to construct the circuit of the present invention on a silicon chip. Further, a portion or all of the elements of the present invention may be implemented as discrete devices, departures from the specific control signal configuration are possible, more or less than 64 bits may be used, etc. Many such changes or modifications will be readily apparent to one of ordinary skill in the art. The specification and drawings are, accordingly, to be regarded in an illustrative rather than a restrictive sense, the invention being limited only by the provided claims.

We claim:

1. A binary shifter for shifting an n-bit wide binary word, wherein the binary shifter includes n shifter input lines for applying electrical signals representing an n-bit word to-be shifted, wherein the binary shifter also includes n shifter output lines for outputing electrical signals representing the result of the shift operation, the binary shifter further comprising;

selection means for selecting between one of three input words, wherein the selection means includes first, second and third n-bit wide word inputs, an n-bit wide word output and one or more select signals for determining which of the first, second or third word inputs are applied to the word output, wherein the n shifter input lines are coupled to the first word input;

register means for storing and accessing a word of data, wherein the register means has an n-bit wide word input and an n-bit wide word output, wherein the register means word output is coupled to the selection means second word input, wherein the word input of the register means is coupled to the n shifter input lines; and shifter array means for performing an M-bit shift on an n-bit word, wherein the shifter array means includes an n-bit wide word input and an n-bit wide word output, wherein the word output of the selection means is coupled to the word input of the shifter array means, wherein the shifter array word output is coupled to the third word input of the selection means and to the n shifter output lines.

2. The binary shifter of claim 1 wherein M is less than n-1.

3. A method for shifting an N-bit binary word by S bits in an electrical circuit including N input lines, N output lines and a shifter array, wherein the shifter array includes an input and output, wherein the shifter array is capable of shifting an N-bit binary word by up to M bits where M <S, wherein the input lines are coupled to the input of the shifter array, wherein the output lines are coupled to the output of the shifter array, wherein the output of the shifter array is selectively coupled to the input of the shifter array, the method comprising the steps of:

representing the binary word as a first set of logic levels on the input lines;

applying the first set of logic levels on the input lines to the input of the shifter array;

shifting the first set of logic levels by M bits in the shifter array;

representing the result of the shifting step as a second set of logic levels;

applying the second set of logic levels to the input of the shifter array;

shifting the second set of logic levels by S-M bits in the shifter array;

representing the results of the shifting the second set step as a third set of logic levels; and applying the third set of logic levels to the output lines.

4. The method of claim 3, wherein M is equal to one-half of N.

5. A binary shifter fabricated on a silicon chip substrate for shifting a binary word of data and outputing the result of the shifted binary word, wherein the shifter includes an array for performing a shift operation on a binary word, wherein the array includes a plurality of horizontal data lines and a plurality of vertical output lines, wherein the chip includes a plurality of external input lines for providing signals defining the binary word to be shifted and a plurality of external output lines for providing the result of the shift operation, wherein the external output lines are coupled to the vertical output lines, wherein the shifter further comprises:

first pre-multiplexing means coupled to a plurality of said external input lines for selecting one of the external input lines and outputing the selected input line;

second pre-multiplexing means coupled to a plurality of said external input lines for selecting one of the external input lines and outputing the selected input line;

first tri-state means coupled to an output of the first pre-multiplexing means for selectively providing the output of the first pre-multiplexing means;

second tri-state means coupled to an output of the second pre-multiplexing means for selectively providing the output of the second pre-multiplexing means;

a section of horizontal data lines coupled to a subset of the vertical output lines, wherein the section of horizontal data lines has first and second ends; and wherein an output of the first tri-state means is coupled to the first end of the section of horizontal data lines and wherein an output of the second tri-state means is coupled to the second end of the section of horizontal data lines.

6. An improved binary shifter for shifting a binary word a predetermined number of bit positions, comprising:
- word input means for applying the binary word to the binary shifter as a set of electrical input signals;
- word output means for providing the result of the shift as a set of electrical output signals;
- shift left input means for accepting a shift left signal indicating that a left shift of the binary word is to be performed;
- shift right input means for accepting a shift right signal indicating that a right shift of the binary word is to be performed;
- one or more horizontal data lines selectively coupled to one or more vertical data lines;
- first and second premux means, each coupled to the shift left and shift right signals, wherein each premux means comprises
  - (i) multiplexing means coupled to two or more input signals for selecting one of the two or more input signals;
  - (ii) a left data output line;
  - (iii) a right data output line;
  - (iv) data enabling means for placing the selected input signal on the left data output line when the shift left signal indicates that a left shift of the binary word is to be performed and for placing the selected input signal on the right data output line when the shift right signal indicates that a right shift of the binary word is to be performed;
- the first premux means right data line coupled to a first horizontal data line;
- the second premux means left data line coupled to the first horizontal data line; and
- at least one of said vertical data lines coupled to an output signal.

* * * * *